Feb. 9, 1926.

A. CHRISTIANSON

SIDE BEARING FOR CAR TRUCKS

Filed Dec. 13, 1924

1,572,128

INVENTOR
Andrew Christianson
By Kay, Totten & Martin
Attorneys.

Patented Feb. 9, 1926.

1,572,128

UNITED STATES PATENT OFFICE.

ANDREW CHRISTIANSON, OF BUTLER, PENNSYLVANIA.

SIDE BEARING FOR CAR TRUCKS.

Application filed December 13, 1924. Serial No. 755,752.

*To all whom it may concern:*

Be it known that I, ANDREW CHRISTIANSON, a citizen of the United States, and a resident of Butler, in the county of Butler and State of Pennsylvania, have invented a new and useful Improvement in Side Bearings for Car Trucks; and I do hereby declare the following to be a full, clear, and exact description thereof.

My invention relates to side bearings for car trucks, and particularly to anti-friction bearings especially adapted for mounting between opposing surfaces of truck bolsters and body bolsters, at the ends thereof.

One object of my invention is to provide an improved form of bearing wherein movement of the anti-friction members is so controlled that they are at all times in proper load-receiving position.

Another object of my invention is to provide means whereby the distance through which the anti-friction member rolls in service is controlled with definite relation to the relative horizontal movements of the body and truck bolsters.

Still another object of my invention is to simplify and improve generally the structure and operation of bearings of the character referred to.

While the invention is herein shown and described as applied to the bolsters of railway cars, it will be apparent that its use is not limited to railway cars.

Figure 1:
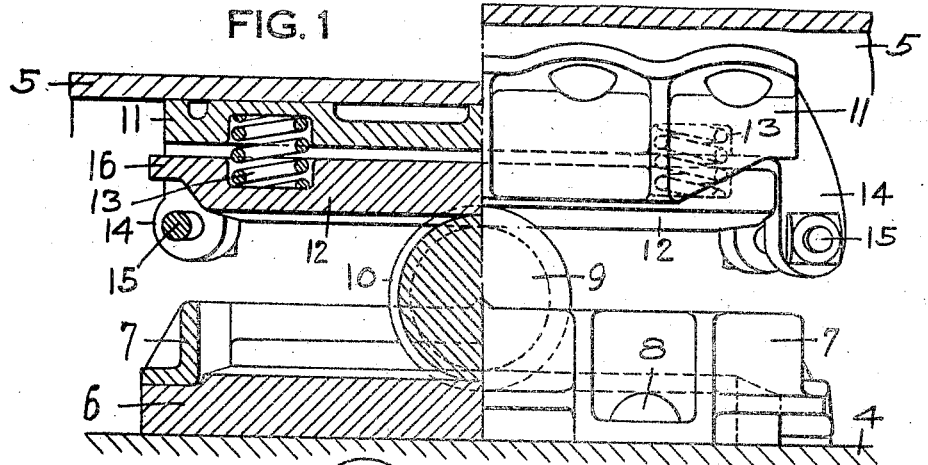
Figure 2:
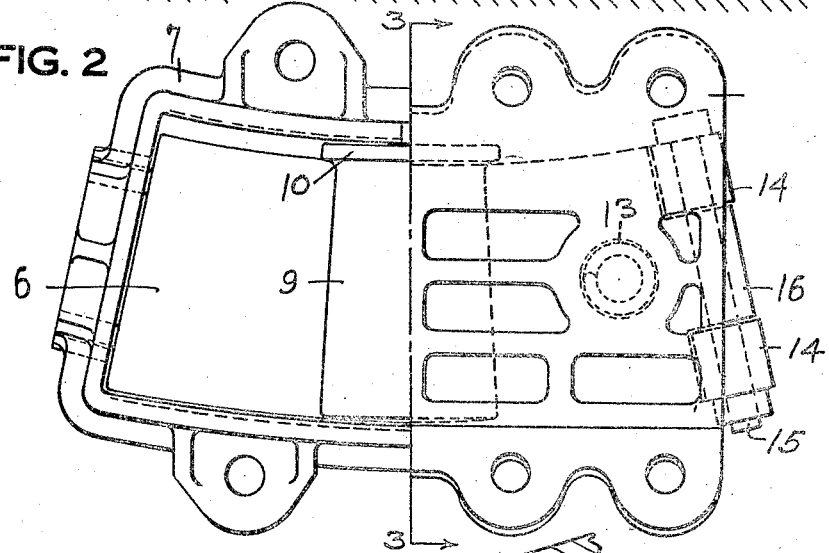
Figure 3:
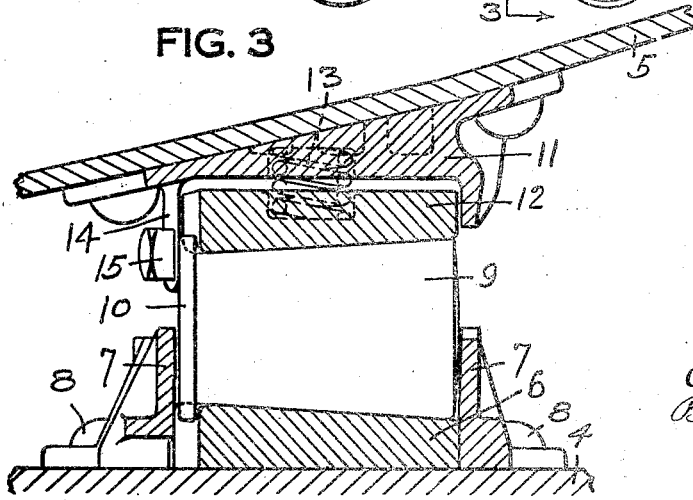

One of the forms which my invention may take is shown in the accompanying drawing wherein Fig. 1 is a view, partially in elevation and partially in section, of a bearing structure embodying my invention; Fig. 2 is a partial plan and partial sectional view of the device of Fig. 1, and Fig. 3 is a sectional view taken on the line 3—3 of Fig. 2.

My structure is shown as applied between a truck bolster 4 and a body bolster 5, only sufficient of each of the bolsters being shown to explain the invention. Upon the bolster 4 rests a bottom bearing plate 6 partially encased within a housing 7 that is bolted at 8 to the bolster 4. The plate 6 and the housing 7 are of arcuate form, preferably concentric to the center pin (not shown) of the car. A roller 9 of tapered form, so that it will tend to follow the curvature of the plate 6, is supported by said plate and is provided with an annular rib 10 that rolls within a groove formed in the plate 6. This rib serves to assist in maintaining the roller 9 in proper position longitudinally of its axis upon the plate 6.

An upper housing member 11 is bolted to the body bolster 5 and serves to partially enclose an upper bearing plate 12 that rests upon the roller 9. The upper plate 12 is held in constant engagement with the roller 9 by means of springs 13 so that the roller cannot at any time roll idly from one end to the other of the housing 7 that partially encloses the same. This is an important feature of my invention.

In order to prevent the upper plate 12 from falling out of the housing 11, I provide said housing with lugs 14 that extend downwardly and are perforated at their lower ends to receive a bolt or pin 15. The plate 12 is provided with an overhanging or undercut portion 16 that is engaged by the pins 15 under conditions where the roller 9 no longer serves as a support for said plate. It will be understood, however, that the plate 12 has such range of movement within its housing 11 as to permit it to normally move vertically such distance that it is constantly maintained in engagement with the roller 9.

The arcuate form of the bearing plates and the tapered form of the roller permits movement of the roller with a minimum amount of friction when the truck has swiveling movement around the center pin, and the provision of the springs 13 or equivalent yielding elements insures that the roller will follow the swiveling movements of the truck with respect to the car body, and thus be at all times in proper load-receiving position. Furthermore, by reason of the fact that the movement of the roller 9 is controlled by constant engagement thereof with the plates 6 and 12, its distance of travel in any instance is only one-half the distance of relative horizontal movement as between the plates 6 and 12, so that the roller will never be carried too far from the transverse center line of the plates 6 and 12, but will always be close enough to such center line of the truck bolster to transmit thrusts to the bolster at the points where such bolster is strongest, namely, points adjacent to the mid-portion thereof.

It will be apparent that more than one anti-friction member or roller may be employed if desired and that various changes in detail and general arrangement may be made without departing from the spirit and scope of the invention as defined in the accompanying claims.

I claim as my invention:

1. Bearing structure comprising a bottom plate, a roller mounted on said plate, an upper bearing plate above the roller and normally supported thereby, a housing partially enclosing said upper plate, releasable means for limiting the downward movement of said upper plate with respect to said housing when out of engagement with said roller, and means for biasing the upper plate toward its lower extremity of movement.

2. Bearing structure comprising a bearing plate, a roller supported on said plate, an upper bearing plate above the roller, a housing partially surrounding said upper plate, said housing being provided with longitudinal recesses, and projections on said upper plate extending loosely into said recesses whereby the vertical movements of said upper plate are limited.

3. Bearing structure comprising a bearing plate, a roller supported on said plate, an upper bearing plate above the roller, a housing partially surrounding said upper plate, said housing being provided with longitudinal recesses, projections on said upper plate extending loosely into said recesses whereby the vertical movements of said upper plate are limited, and compression springs interposed between the upper side of said top plate and housing.

In testimony whereof I, the said ANDREW CHRISTIANSON, have hereunto set my hand.

ANDREW CHRISTIANSON.